(12) United States Patent
Zhu et al.

(10) Patent No.: US 9,302,537 B2
(45) Date of Patent: Apr. 5, 2016

(54) NOISE SUPPRESSION DEVICE FOR A WHEEL ASSEMBLY

(71) Applicant: GM GLOBAL TECHNOLOGY OPERATIONS LLC, Detroit, MI (US)

(72) Inventors: Jinshuo Zhu, Novi, MI (US); Chong Wang, Novi, MI (US); Christopher A. Stirlen, Milford, MI (US); Alan V. Parrett, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 13/968,729

(22) Filed: Aug. 16, 2013

(65) Prior Publication Data

US 2015/0048669 A1    Feb. 19, 2015

(51) Int. Cl.
| | |
|---|---|
| *B60B 21/02* | (2006.01) |
| *B60B 19/00* | (2006.01) |
| *B60C 19/00* | (2006.01) |
| *B60B 17/00* | (2006.01) |

(52) U.S. Cl.
CPC .............. *B60B 19/00* (2013.01); *B60C 19/002* (2013.04); *B60B 17/0024* (2013.01); *B60Y 2200/10* (2013.01)

(58) Field of Classification Search
CPC ....................................................... B60B 21/12
USPC ....................................................... 152/381.5
See application file for complete search history.

(56) References Cited

U.S. PATENT DOCUMENTS

| | | | | |
|---|---|---|---|---|
| 2,537,442 | A | * | 1/1951 | Carriker ......................... 152/153 |
| 4,896,921 | A | * | 1/1990 | Sato et al. ....................... 301/5.1 |
| 5,891,278 | A | * | 4/1999 | Rivin ............................. 152/418 |
| 5,899,253 | A | * | 5/1999 | Marron et al. ............. 152/381.5 |
| 6,244,314 | B1 | * | 6/2001 | Dodt et al. .................... 152/158 |
| 6,309,026 | B1 | | 10/2001 | Svedhem |
| 6,343,843 | B1 | | 2/2002 | Nishikawa |
| 6,390,563 | B1 | * | 5/2002 | Haverkamp et al. ......... 301/6.91 |
| 6,422,655 | B1 | | 7/2002 | Britton et al. |
| 6,516,849 | B2 | * | 2/2003 | Flament et al. ............... 152/400 |
| 6,588,469 | B2 | | 7/2003 | Yukawa et al. |
| 6,598,636 | B1 | | 7/2003 | Schurmann et al. |
| 6,705,368 | B2 | * | 3/2004 | Glinz et al. ................... 152/400 |
| 6,755,483 | B2 | | 6/2004 | Yukawa et al. |
| 6,880,597 | B2 | | 4/2005 | Yukawa et al. |
| 7,013,940 | B2 | | 3/2006 | Tsihlas |
| 7,140,412 | B2 | | 11/2006 | Tanno |
| 7,182,114 | B2 | | 2/2007 | Yukawa |

(Continued)

FOREIGN PATENT DOCUMENTS

| | | |
|---|---|---|
| EP | 0737597 A1 | 10/1996 |
| WO | 2007051232 A1 | 5/2007 |

(Continued)

*Primary Examiner* — Jeffrey J Restifo
(74) *Attorney, Agent, or Firm* — Quinn Law Group, PLLC (57) ABSTRACT

A wheel assembly for a vehicle includes a rim having a noise suppression device. The rim includes an outer radial surface that is concentrically disposed about a central axis. A tire is mounted to the rim to define a tire cavity between the outer radial surface of the rim and an interior surface of the tire. The noise suppression device includes a device wall that defines at least one resonator chamber, and includes a plurality of apertures allowing fluid communication between the tire cavity and the resonator chamber, with each of the plurality of apertures defining an opening area between the range of 0.03 mm$^2$ and 0.8 mm$^2$.

8 Claims, 7 Drawing Sheets

(56) References Cited

U.S. PATENT DOCUMENTS

| | | | |
|---|---|---|---|
| 7,188,652 B2 | 3/2007 | Yukawa | |
| 7,201,197 B2* | 4/2007 | Kuramori et al. | 152/520 |
| 7,347,239 B2 | 3/2008 | Yukawa et al. | |
| 7,360,570 B2 | 4/2008 | Ishida | |
| 7,387,141 B2 | 6/2008 | Tanno et al. | |
| 7,389,802 B2 | 6/2008 | Kanz et al. | |
| 7,455,092 B2 | 11/2008 | Yukawa et al. | |
| 7,475,713 B2* | 1/2009 | Naito et al. | 152/400 |
| 7,490,644 B2 | 2/2009 | Yukawa | |
| 7,500,499 B2 | 3/2009 | Tanno | |
| 7,681,611 B2 | 3/2010 | Ikeda et al. | |
| 7,681,613 B2 | 3/2010 | Yukawa et al. | |
| 7,690,410 B2* | 4/2010 | Kamiyama et al. | 152/381.5 |
| 7,694,707 B2 | 4/2010 | Agostini et al. | |
| 7,740,035 B2* | 6/2010 | Fowler-Hawkins | 152/381.5 |
| 8,181,685 B2* | 5/2012 | Kamiyama et al. | 152/381.5 |
| 2004/0066083 A1 | 4/2004 | Tsihlas | |
| 2004/0206437 A1* | 10/2004 | Akiyama et al. | 152/341.1 |
| 2004/0250935 A1* | 12/2004 | Morinaga et al. | 152/381.5 |
| 2008/0264539 A1 | 10/2008 | Merino-Lopez et al. | |
| 2009/0026006 A1 | 1/2009 | Engel et al. | |
| 2009/0071585 A1 | 3/2009 | Tanno | |
| 2009/0090446 A1 | 4/2009 | Ikeda et al. | |
| 2009/0151837 A1 | 6/2009 | Uhlenbruch | |
| 2009/0277549 A1 | 11/2009 | Tanno | |
| 2009/0277553 A1 | 11/2009 | Tanno et al. | |
| 2009/0314403 A1 | 12/2009 | Tanno | |
| 2009/0320980 A1 | 12/2009 | Tanno | |
| 2010/0012243 A1 | 1/2010 | Tanno et al. | |
| 2010/0012244 A1 | 1/2010 | Tanno et al. | |
| 2010/0071820 A1 | 3/2010 | Noggle et al. | |
| 2010/0096909 A1* | 4/2010 | Kamiyama et al. | 301/95.104 |
| 2010/0307654 A1 | 12/2010 | Dautrey et al. | |
| 2011/0057505 A1* | 3/2011 | Nagata et al. | 301/95.102 |

FOREIGN PATENT DOCUMENTS

| | | |
|---|---|---|
| WO | 2008071422 A1 | 6/2008 |
| WO | 2009053352 A1 | 4/2009 |

\* cited by examiner

NOISE SUPPRESSION DEVICE FOR A WHEEL ASSEMBLY

TECHNICAL FIELD

The invention generally relates to a wheel assembly, and more specifically to a noise suppression device for the wheel assembly.

BACKGROUND

Vehicles are subject to road noise caused by acoustic resonances associated with a wheel assembly of the vehicle. Road noise resonates within a tire cavity of the wheel assembly, which is defined between a rim and a tire of the wheel assembly. The acoustic resonance is dependent upon such things as, but not limited to, the tire size, rim size, vehicle suspension, or the body structure of the vehicle. Typically, the acoustic resonance is between the range of 160 Hz and 240 Hz.

SUMMARY

A wheel assembly for a vehicle is provided. The wheel assembly includes a rim having a noise suppression device. The rim includes an outer radial surface that is concentrically disposed about a central axis. The noise suppression device includes a device wall that defines at least one resonator chamber. The device wall includes a plurality of apertures, with each of the plurality of apertures defining an opening area between the range of 0.03 mm$^2$ and 0.8 mm$^2$.

A rim assembly is also provided. The rim assembly includes a rim having a noise suppression device. The rim includes an outer radial surface concentrically disposed about a central axis. The noise suppression device includes a device wall that defines at least one resonator chamber. At least one baffle is disposed within the at least one resonator chamber. The device wall includes a plurality of apertures, with each of the plurality of apertures defining an opening area between the range of 0.03 mm$^2$ and 0.8 mm$^2$. The plurality of apertures is arranged in the device wall to define an average density between the range of 300 apertures per square meter and 100,000 apertures per square meter. Each of the plurality of apertures includes a radial length relative to the central axis that is between the range of 0.1 mm and 0.5 mm.

A noise suppression device for a wheel assembly of a vehicle is also provided. The noise suppression device includes a device wall that is configured for attachment to a rim of the wheel assembly, to define at least one resonator chamber. The device wall includes a plurality of apertures, with each of the plurality of apertures defining an opening area between the range of 0.03 mm$^2$ and 0.8 mm$^2$.

Accordingly, the noise suppression device of the rim is disposed within the tire cavity, between the outer radial surface of the rim and an interior surface of a tire. The noise suppression device is operable to attenuate or suppress road noise that resonates within the tire cavity. The size and number of the apertures in the device wall of the noise suppression device effectively suppress the acoustic resonance from the tire cavity over a wide frequency band so that the noise suppression device of a given rim suppresses noise for various tire sizes. The noise suppression device may be tuned, by changing the volume of the resonator chamber, the opening area of the apertures, the length of the apertures, the density of the apertures, and/or the number of the baffles, to optimize a sound absorptive effect over a desired frequency range to satisfy a broad tire cavity frequency change due to different tire sizes, different temperature ranges, and different vehicle speeds.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, a wheel assembly is generally shown at 20. The wheel assembly 20 is for a vehicle, and includes a rim assembly 22 and a tire 24. The rim assembly 22 includes a rim 26. The rim 26 defines an outer radial surface 28 that is concentrically disposed about a central axis 30. The tire 24 is mounted to the rim 26 in a manner known to those skilled in the art. The tire 24 cooperates to define a tire cavity 32 that is formed between an interior surface 34 of the tire 24 and the outer radial surface 28 of the rim 26.

The rim assembly 22 includes a noise suppression device 36 for suppressing road noise from resonating within the tire cavity 32. The noise suppression device 36 may be manufactured and formed independently of the rim 26, and fixedly attached to the rim 26. Alternatively the noise suppression device 36 may be integrally formed with the rim 26. The noise suppression device 36 includes a device wall 38 that is attached to the rim 26, or integrally formed with the rim 26. The device wall 38 may include either a curved planar body or a tubular body. The device wall 38 at least partially defines at least one resonator chamber 40 disposed within the tire cavity 32.

Preferably, the device wall 38 includes and is manufactured from a metal, such as steel or aluminum. However, the device wall 38 may include and be manufactured from some other suitable material, such as plastic or rubber, that is capable of maintaining its shape and configuration within the tire cavity 32 during rotation of the wheel assembly 20 about the central axis 30. As noted above, the device wall 38 may be fixedly attached to the rim 26. The device wall 38 may be attached to the rim 26 in any suitable manner, including but not limited to welding the device wall 38 to the rim 26, gluing or adhering the device wall 38 to the rim 26, or fastening the device wall 38 to the rim 26 with one or more fasteners.

The device wall 38 includes a wall surface 42 that is radially spaced from the outer radial surface 28 of the rim 26 to define a maximum separation distance 44 between the outer radial surface 28 of the rim 26 and the wall surface 42 of the device wall 38. Preferably, the maximum separation distance 44 is between the range of 3.0 mm and 100 mm. However, it should be appreciated that the maximum separation distance 44 may vary from the exemplary range provided herein.

Figure 1:
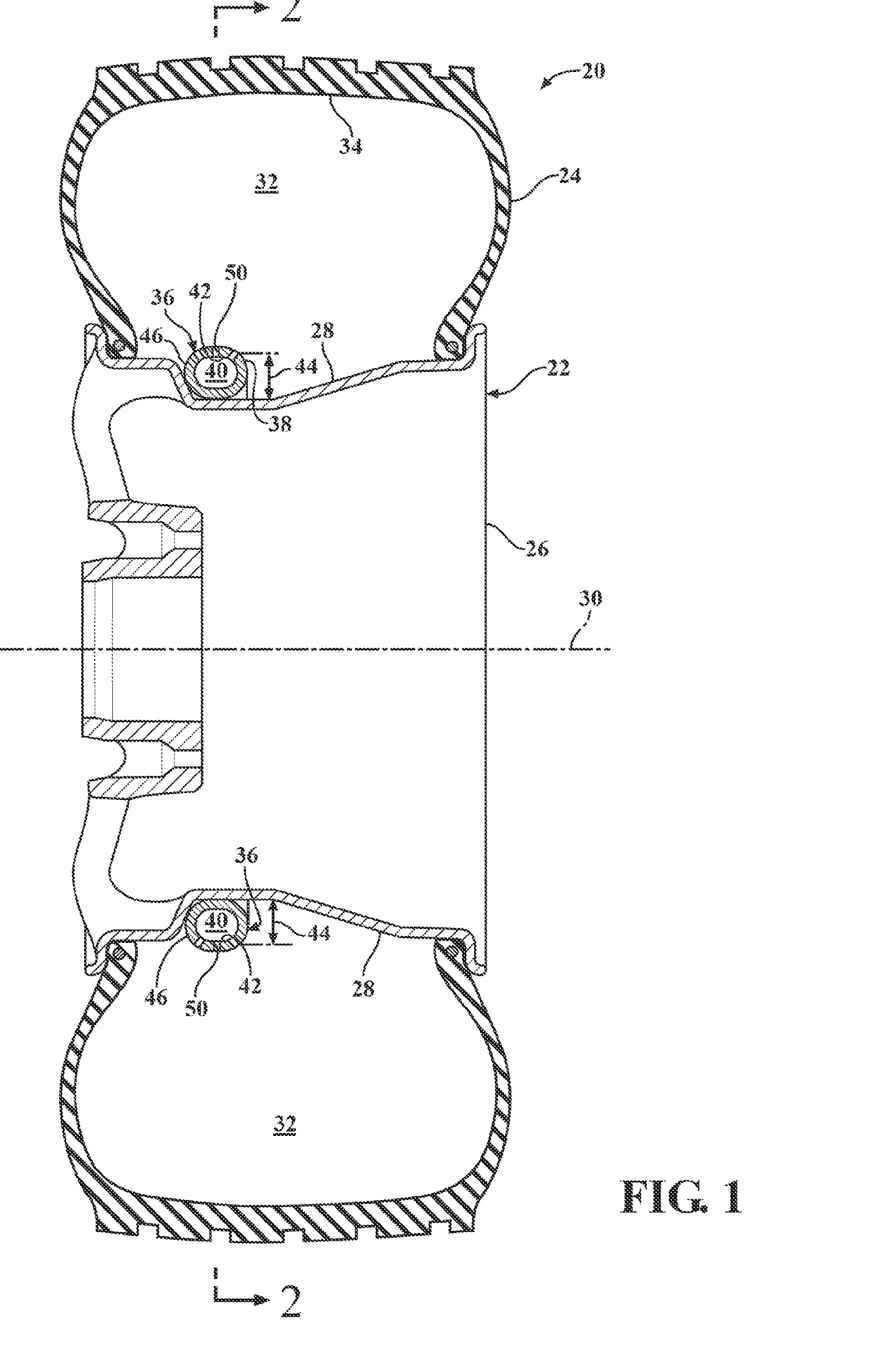
FIG. 1 is a schematic cross sectional view of a wheel assembly parallel to a central axis.
Figure 2:
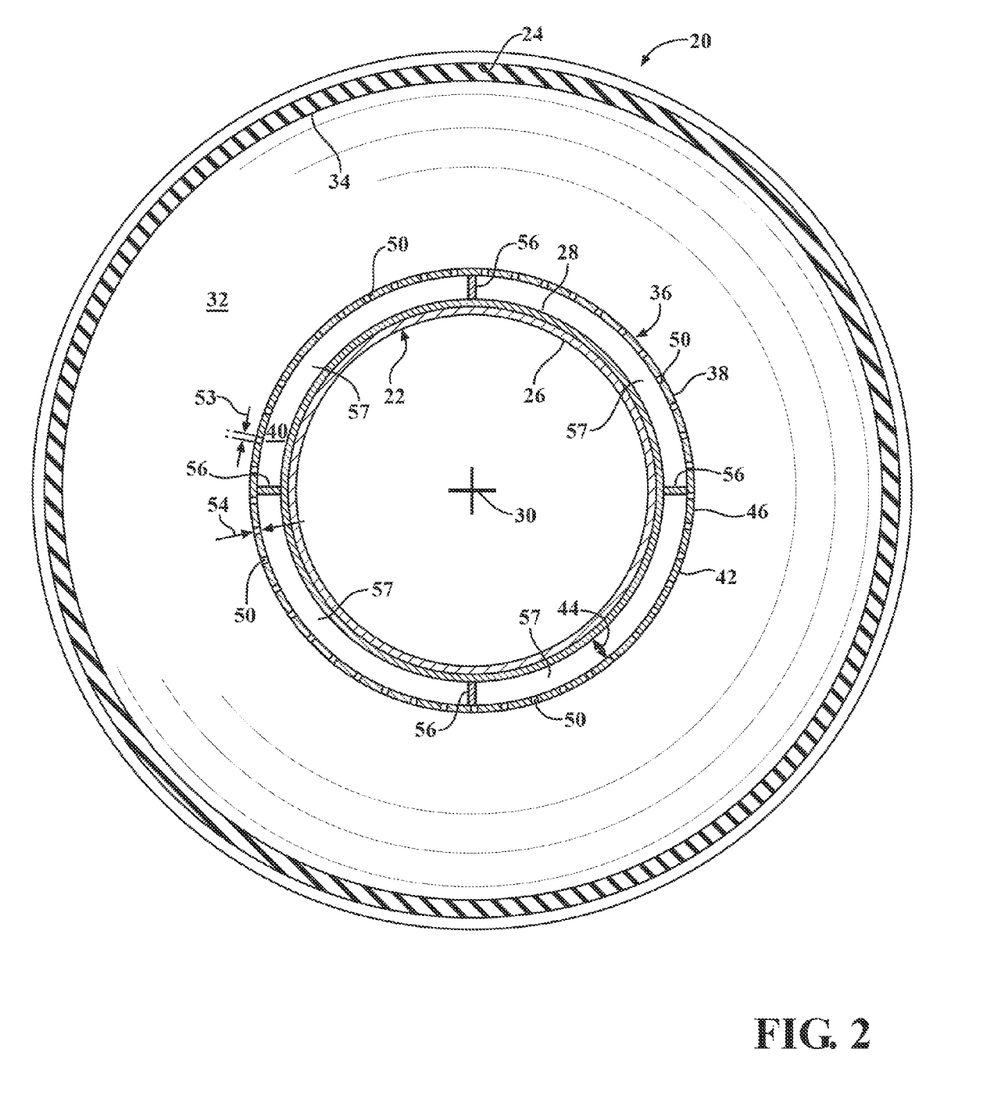
FIG. 2 is a schematic cross sectional view of the wheel assembly shown in FIG. 1 perpendicular to the central axis.

Referring to FIGS. 1 and 2, the device wall 38 is formed to include a tubular device wall 46. As such, the device wall 38 defines a closed cross sectional shape, perpendicular to the central axis 30, which defines the tubular device wall 46. The closed cross sectional shape of the tubular device wall 46 forms the resonator chamber 40 therein, i.e., an interior of the tubular device wall 46 defines the resonator chamber 40. The tubular device wall 46 may include a cross sectional shape perpendicular with the central axis 30 that defines one of either an annular cross sectional shape or a rectangular cross sectional shape. The annular cross sectional shape may include, but is not limited to a circular or elliptical cross sectional shape, or some other shape that substantially forms a ring-like device wall 38. The rectangular cross sectional shape may include, but is not limited to a square or rectangular shape. It should be appreciated that the tubular device wall 46 may alternatively include some other cross sectional shape, such as polygonal or similar shape as well. As shown in FIGS. 1 and 2, the tubular device wall 46 extends completely around the circumference of the outer radial surface 28 of the rim 26.

Figure 3:
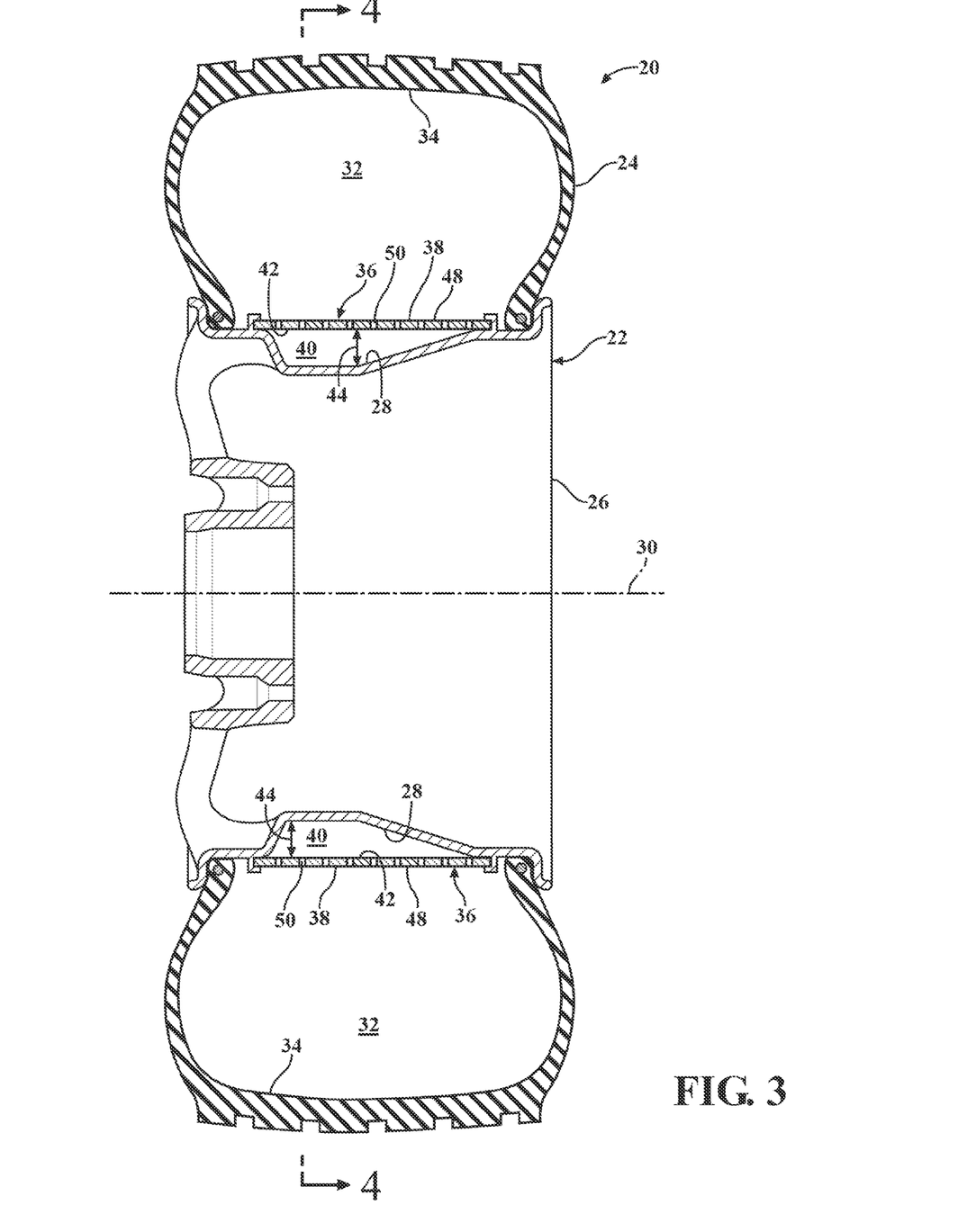
FIG. 3 is a schematic cross sectional view of a first alternative embodiment of the wheel assembly parallel to the central axis.
Figure 4:
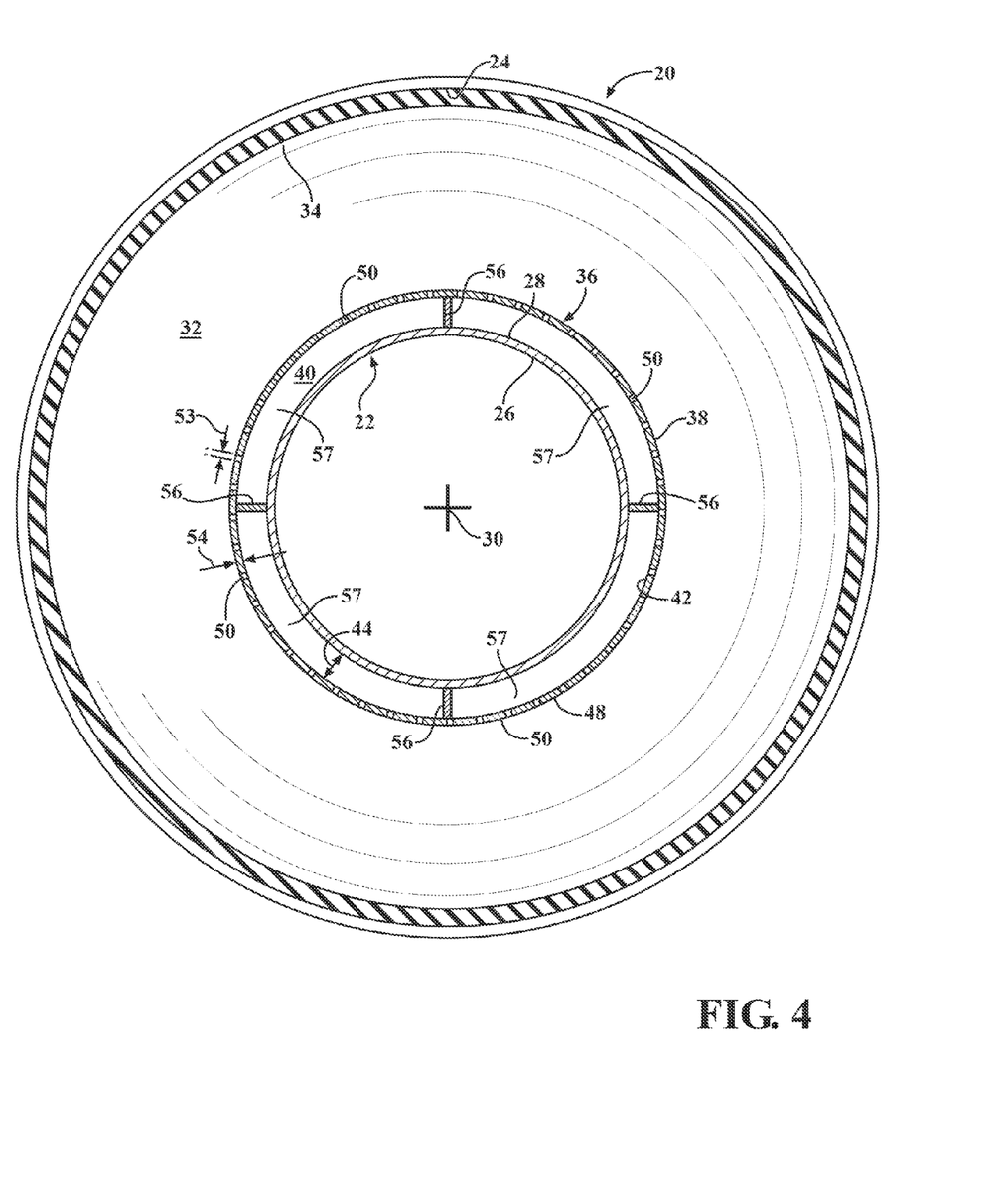
FIG. 4 is a schematic cross sectional view of the first alternative embodiment of the wheel assembly shown in FIG. 3 perpendicular to the central axis.
Figure 5:
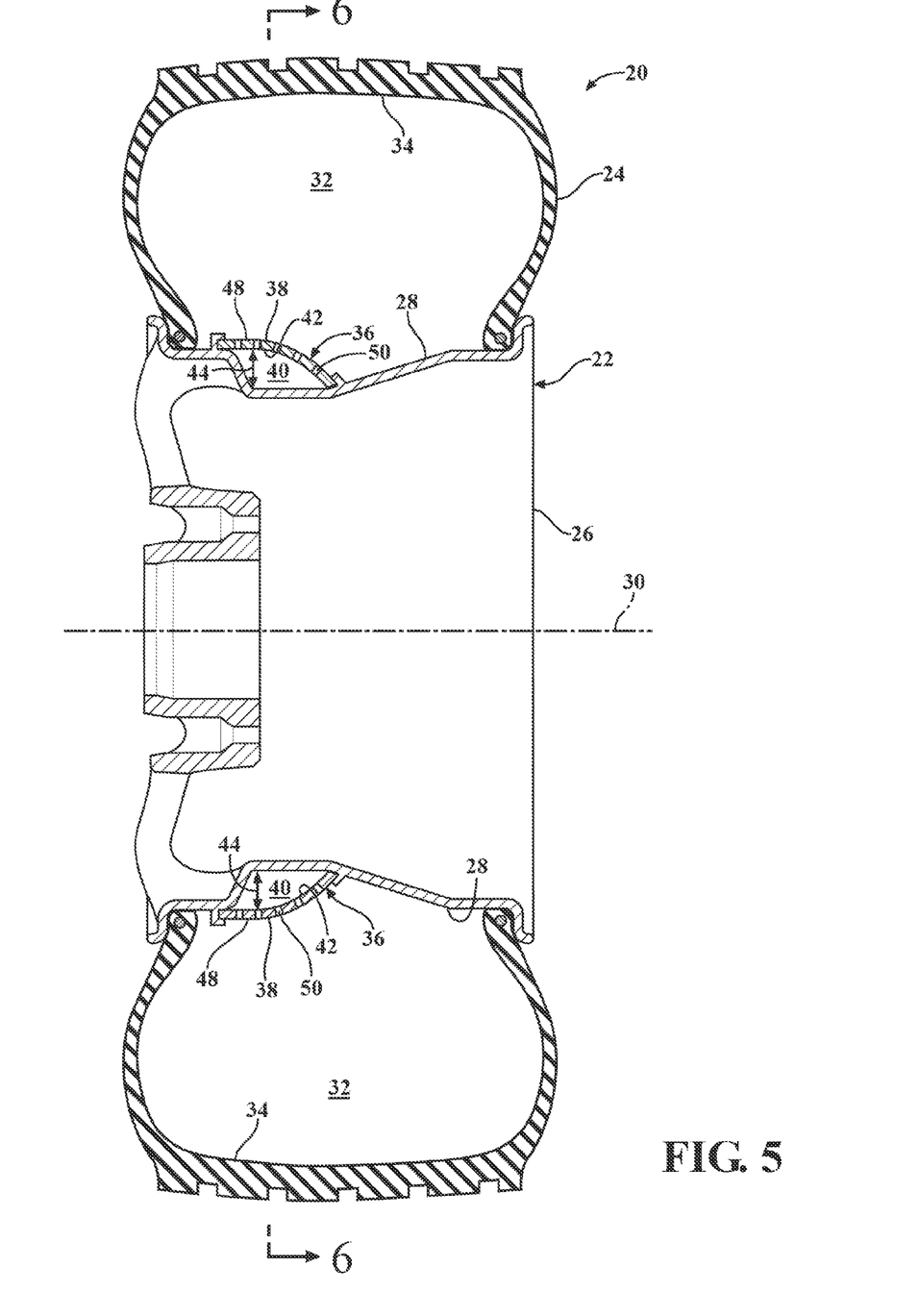
FIG. 5 is a schematic cross sectional view of a second alternative embodiment of the wheel assembly parallel to the central axis.
Figure 6:
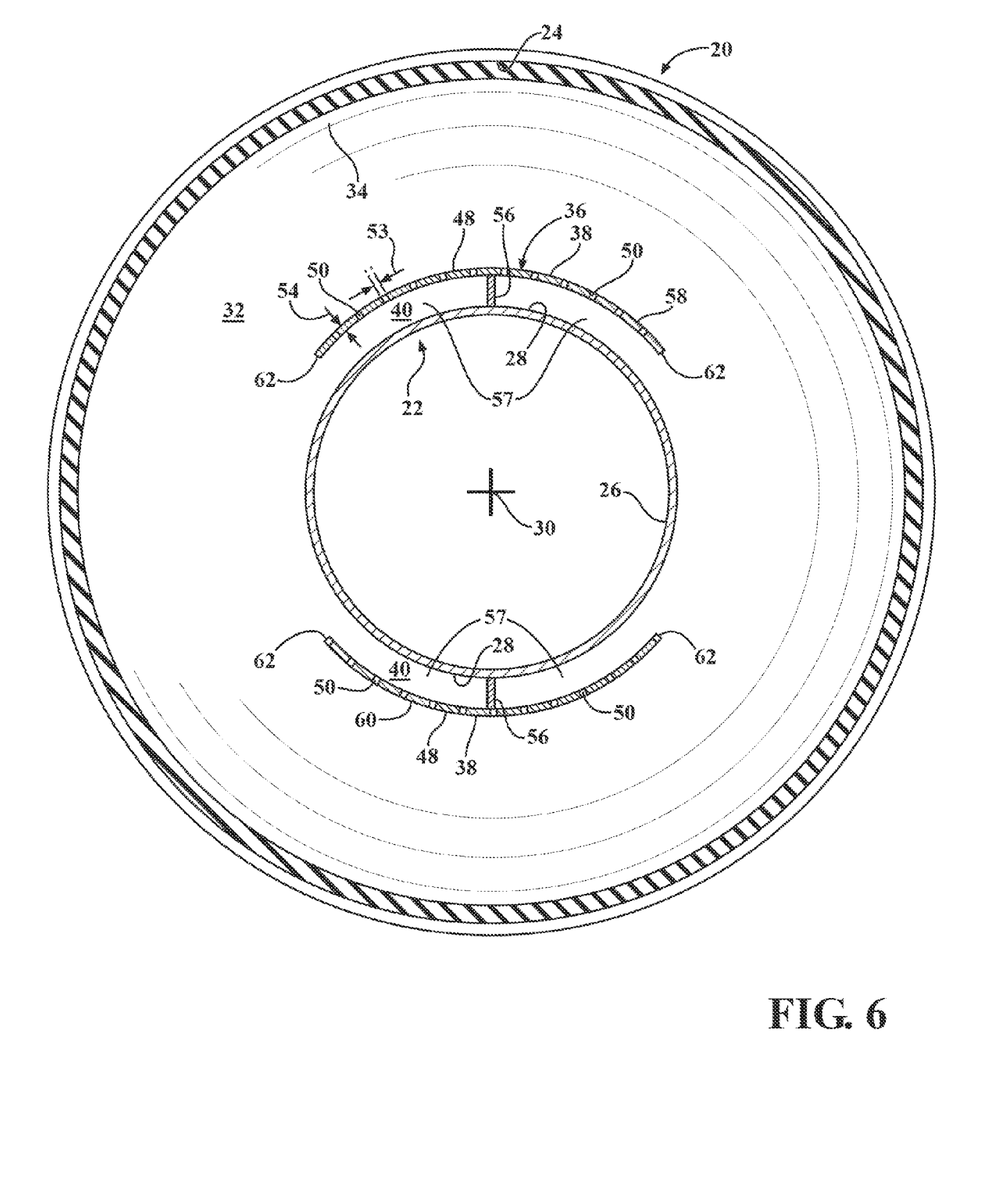
FIG. 6 is a schematic cross sectional view of the second alternative embodiment of the wheel assembly show in FIG. 5 perpendicular to the central axis.

Referring to FIGS. 3 through 6, the device wall 38 is formed from an annular or semi-annular substrate 48. The device wall 38 cooperates with the outer radial surface 28 of the rim 26 to define the resonator chamber 40 therebetween. The device wall 38 defines a cross sectional shape perpendicular to the central axis 30 having edges that circumferentially align with the outer radial surface 28 of the rim 26. Accordingly, the exact cross sectional shape of the substrate 48 depends upon the cross sectional profile of the outer radial surface 28 of the rim 26, and the volume of the resonator chamber 40 defined therebetween. As shown in FIGS. 3 and 4, the device wall 38 may be formed to include a cross sectional shape perpendicular with the central axis 30 that defines a substantially planar or flat shape. As shown in FIGS. 5 and 6, the device wall 38 may be formed to include a cross sectional shape perpendicular with the central axis 30 that defines a curvilinear cross sectional shape. The embodiment of the device wall 38 shown in FIGS. 3 and 4 extends completely around the circumference of the outer radial surface 28 of the rim 26. However, the embodiment of the device wall 38 shown in FIGS. 5 and 6 only partially extends around the circumference of the outer radial surface 28 of the rim 26. It should be appreciated that the device wall 38 may be formed to include some other shape and/or configuration not shown in the exemplary embodiments herein.

Figure 7:
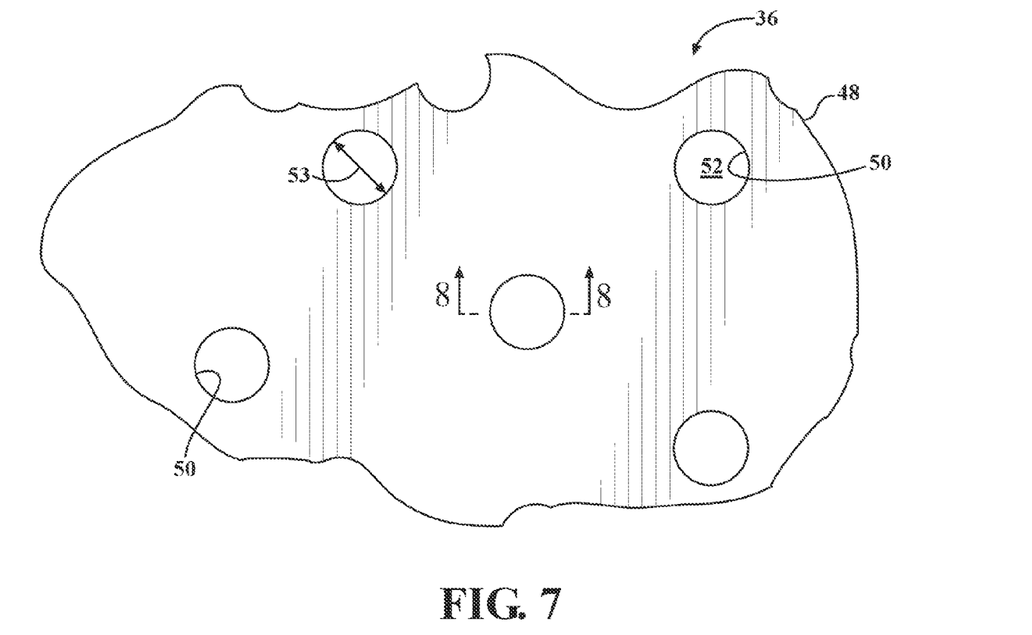
FIG. 7 is a schematic fragmentary plan view of a device wall of a noise suppression device of the wheel assembly.
Figure 8:
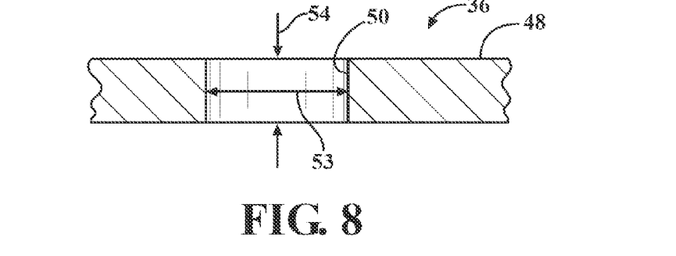
FIG. 8 is a schematic cross sectional view of the device wall of the noise suppression device taken along cut line 8-8 shown in FIG. 7.

The device wall 38 includes a plurality of apertures 50 allowing acoustic communication from and between the tire cavity 32 into and from the resonator chamber 40. Referring to FIG. 7, each of the apertures 50 defines an opening area 52 that is between the range of 0.03 $mm^2$ and 0.8 $mm^2$. However, it should be appreciated that the opening area 52 of each of the apertures 50 may differ from the exemplary range provided herein. Preferably, each of the apertures 50 defines an approximately circular hole having a diameter 53 between the range of 0.2 mm and 1.0 mm. However, it should be appreciated that the apertures 50 may include other configurations, such as rectangular openings, elliptical openings, polygonal openings, etc. The apertures 50 are arranged in the device wall 38 to define an average density. The average density is defined herein as the average number of apertures 50 per unit area of the device wall 38. Preferably, the average density is between the range of 300 apertures per square meter and 100,000 apertures per square meter. However, it should be appreciated that the average density may differ from the exemplary range provided herein. Furthermore, the apertures 50 may be arranged to define a number of apertures per circumferential length of the device wall 38. For example, the device wall 38 may include between 5 apertures per meter and 500 apertures per meter along the circumference of the device wall 38. Referring to FIG. 8, each of the apertures 50 includes a radial length 54 relative to the central axis 30. The radial length 54 of the apertures 50 is the length of the aperture 50 extending through the device wall 38. As such, the radial length 54 of the apertures 50 is substantially equal to a cross sectional thickness of the device wall 38. Preferably, the radial length 54 of the apertures 50 is between the range of 0.1 mm and 1.0 mm. However, it should be appreciated that the radial length 54 of the apertures 50 may differ from the exemplary range provided herein.

Referring to FIGS. 2, 4 and 6, the noise suppression device 36 may further include at least one baffle 56. Preferably, the noise suppression device 36 includes an equal number of baffles 56 angularly spaced about the central axis 30 an equal angular distance from each other so that the noise suppression device 36 is rotationally balanced about the central axis 30. The baffles 56 are disposed within the resonator chamber 40, and extend radially inward from the device wall 38 into abutting engagement with the outer radial surface 28 of the rim 26. The baffles 56 divide the resonator chamber 40 into sub-chambers 57. As shown in FIGS. 2 and 4, the noise suppression device 36 includes four baffles 56, defining four resonator sub-chambers 57. However, it should be appreciated that the number of baffles 56 and the number of resonator sub-chambers 57 may vary from the exemplary embodiments provided herein.

As noted above, the noise suppression device 36 should be rotationally balanced about the central axis 30. Accordingly, referring to FIGS. 2 and 4, the device wall 38, including all baffles 56, is preferably symmetrically configured about the central axis 30 such that a first half of the noise suppression device 36 is a mirror image of a second half of the noise suppression device 36 across a mirror plane extending parallel with and aligned along the central axis 30.

FIG. 6 shows a slightly different configuration. The noise suppression device 36 shown in FIG. 6 includes a first device wall 58 and a second device wall 60, with the first device wall 58 and the second device wall 60 disposed on opposing diametric halves of the rim 26, such that the first device wall 58 and the second device wall 60 are mirror images of each other across a mirror plane extending parallel with and aligned along the central axis 30. The resonator chambers 40 shown in FIG. 6 include an open end 62 that is open to acoustic communication with the tire cavity 32. In contrast, the resonator chambers 40 shown in FIGS. 2 and 4 include closed ends, and the only acoustic communication between the tire cavity 32 and the resonator chambers 40 is through the apertures 50.

The noise suppression device 36 is tunable to suppress noise within a pre-defined frequency range. Preferably, the noise suppression device 36 is tuned to optimally suppress noise within the frequency range of 160 Hz and 240 Hz. However, the noise suppression device 36 may be tuned to optimally suppress noise within varying frequency ranges. The noise suppression device 36 is tuned by adjusting at least one of the density of apertures 50 per unit area, the opening area 52 of the apertures 50, the radial length 54 of the apertures 50, the total number of baffles 56 and/or resonator chambers 40, or the volume of the resonator chamber 40.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A rim assembly comprising:
a rim including an outer radial surface concentrically disposed about a central axis, and a noise suppression device including a device wall defining at least one resonator chamber; and
at least one baffle disposed within the at least one resonator chamber;
wherein the device wall includes a plurality of apertures, with each of the plurality of apertures defining an opening area between the range of 0.03 mm² and 0.8 mm²;
wherein the plurality of apertures are arranged in the device wall to define an average density between the range of 300 apertures per square meter and 100,000 apertures per square meter; and
wherein each of the plurality of apertures includes a radial length relative to the central axis that is between the range of 0.1 mm and 0.5 mm.

2. The rim assembly as set forth in claim 1 wherein the device wall includes a wall surface radially spaced from the outer radial surface of the rim to define a maximum separation distance between the outer radial surface of the rim and the wall surface of the device wall, wherein the maximum separation distance is between the range of 3.0 mm and 100 mm.

3. The rim assembly as set forth in claim 1 wherein the noise suppression device is formed independently of the rim, and fixedly attached to the rim.

4. The rim assembly as set forth in claim 1 wherein the noise suppression device is integrally formed with the rim.

5. A rim assembly as set forth in claim 1 wherein each of the plurality of apertures defines an approximately circular hole having a diameter between the range of 0.2 mm and 1.0 mm.

6. A rim assembly as set forth in claim 1 wherein the device wall of the noise suppression device includes a cross sectional shape perpendicular to the central axis defining one of either a substantially planar cross sectional shape or a curvilinear cross sectional shape, wherein the device wall includes a wall surface radially spaced from the outer radial surface of the rim to define a maximum separation distance between the outer radial surface of the rim and the wall surface of the device wall, and wherein the maximum separation distance is between the range of 3.0 mm and 100 mm.

7. A rim assembly as set forth in claim 6 wherein the device wall cooperates with the outer radial surface of the rim to define the at least one resonator chamber therebetween.

8. A rim assembly as set forth in claim 1 wherein the device wall of the noise suppression device defines a closed cross sectional shape, perpendicular to the central axis, with the closed cross sectional shape forming the at least one resonator chamber therein.

* * * * *